United States Patent
Waanders et al.

(10) Patent No.: US 6,672,251 B1
(45) Date of Patent: Jan. 6, 2004

(54) METHOD FOR DRYING SLURRY, RINSE WATER AND INDUSTRIAL EFFLUENT AND/OR RESIDUES

(75) Inventors: Marcellinus Bernardus Eduardes Waanders, Enter (NL); Seine Roelofs, Aarle-Rixtel (NL)

(73) Assignee: BioONE Holding, B.V., Aarle-Rixtel (NL)

( * ) Notice: Subject to any disclaimer, the term of this patent is extended or adjusted under 35 U.S.C. 154(b) by 0 days.

(21) Appl. No.: 10/019,351

(22) PCT Filed: Apr. 25, 2000

(86) PCT No.: PCT/NL00/00267

§ 371 (c)(1),
(2), (4) Date: May 7, 2002

(87) PCT Pub. No.: WO01/06191

PCT Pub. Date: Jan. 25, 2001

(30) Foreign Application Priority Data

Apr. 21, 1999 (NL) .............................................. 1011850

(51) Int. Cl.[7] .................................................. F26B 3/06
(52) U.S. Cl. ............................ 119/447; 34/347; 34/349
(58) Field of Search ........................... 119/447; 34/347, 34/349, 282

(56) References Cited

U.S. PATENT DOCUMENTS

| | | | |
|---|---|---|---|
| 3,714,718 A | 2/1973 | Sukup | 34/573 |
| 4,706,607 A | 11/1987 | Ijichi et al. | 119/16 |
| 4,952,339 A * | 8/1990 | Temus et al. | 588/20 |
| 5,037,561 A * | 8/1991 | Copeland | 210/769 |
| 5,666,905 A | 9/1997 | Mackin et al. | 119/448 |
| 5,809,664 A * | 9/1998 | Legros et al. | 34/347 |
| 6,190,566 B1 * | 2/2001 | Kolber | 210/744 |
| 6,254,776 B1 * | 7/2001 | Seagle | 210/603 |
| 6,346,240 B1 * | 2/2002 | Moore, Jr. | 424/76.6 |

FOREIGN PATENT DOCUMENTS

| | | | |
|---|---|---|---|
| CH | 684771 | 12/1994 | |
| DE | 3417984 | 11/1985 | C05F/3/00 |
| DE | 3816822 | 11/1989 | A01C/3/00 |
| DE | 9305644 | 8/1993 | F26B/3/06 |
| DE | 4314645 | 11/1994 | F26B/19/00 |
| EP | 0512966 | 11/1992 | A01C/3/02 |
| FR | 2309814 | 11/1976 | F26B/21/06 |
| FR | 2637968 | 4/1990 | F26B/25/04 |
| NL | 9400025 | 8/1995 | F26B/15/18 |

* cited by examiner

Primary Examiner—Yvonne Abbott
(74) Attorney, Agent, or Firm—Webb Ziesenheim Logsdon Orkin & Hanson, P.C.

(57) ABSTRACT

A method for drying slurry, comprising the steps of: providing an air-permeable drying bed with a suitable carrier material, arranging, for instance spraying, on the drying bed the (semi-liquid) slurry, drawing in and/or blowing drying air and guiding this air through the drying bed; removing thus dried (semi-liquid) slurry, shuffling the carrier material at chosen times, measuring quantities of the drying air; measuring quantities of air guided through the drying bed; and arranging the (semi-liquid) slurry, shuffling the carrier material and removing dried (semi-liquid) slurry on the basis of the measured quantities.

15 Claims, 1 Drawing Sheet

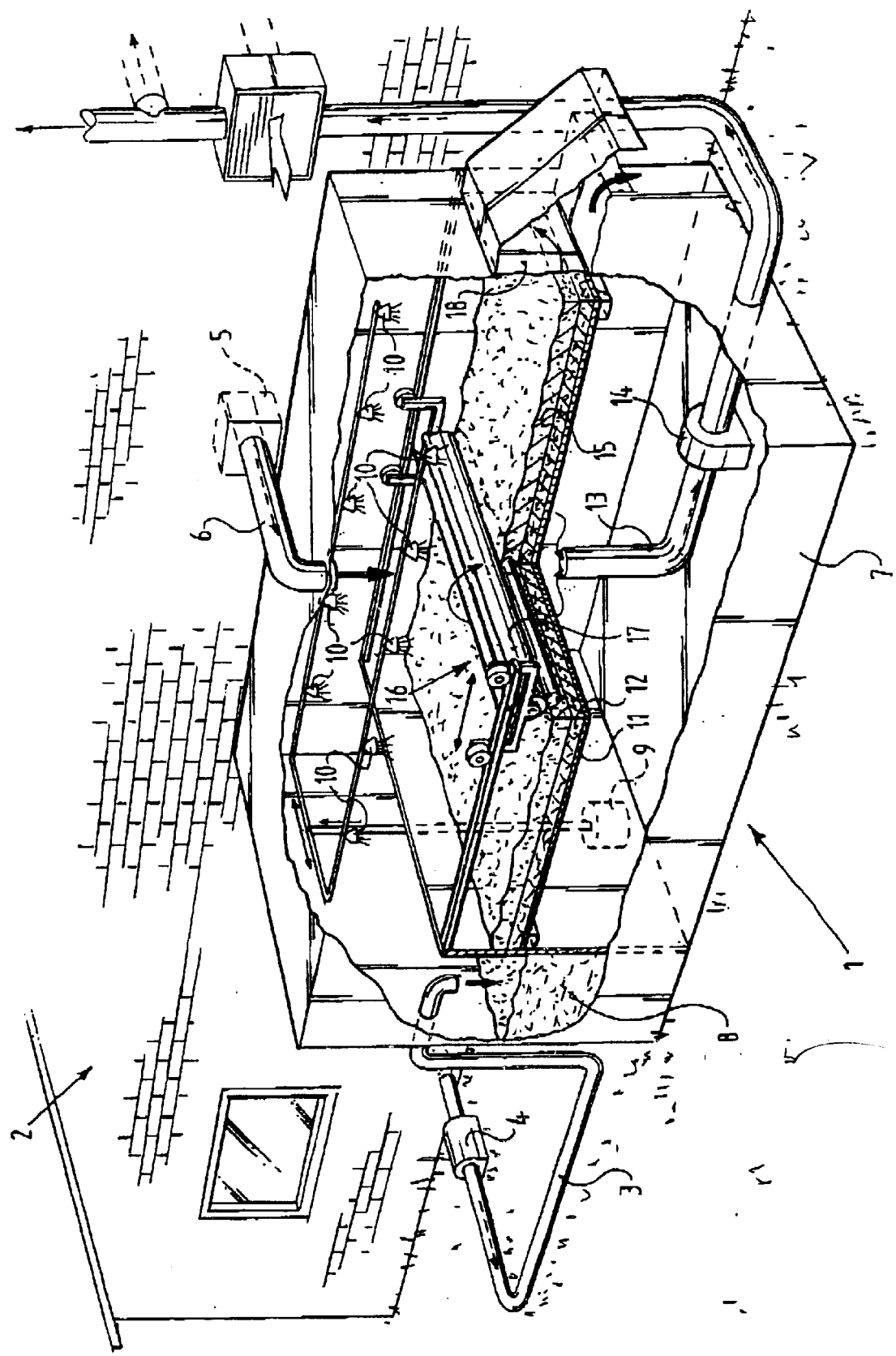

METHOD FOR DRYING SLURRY, RINSE WATER AND INDUSTRIAL EFFLUENT AND/OR RESIDUES

BACKGROUND OF THE INVENTION

1. Field of the Invention

The invention relates to a method for drying slurry, which in a living quarters for animals such as agricultural livestock is produced by these animals, or rinse water or industrial effluent and/or residues, which method comprises the steps of:

providing an air-permeable drying bed with suitable carrier material;

arranging, for instance spraying, the slurry on the drying bed;

drawing in and/or blowing drying air and guiding this air through the drying bed;

removing thus dried manure; and shuffling the carrier material at chosen times, for instance periodically, in order to ensure a predetermined air-permeability of the drying bed.

2. Description of the Related Art

According to known methods for drying slurry the slurry is first of all separated into a thin and a thick fraction, whereafter the thick fraction is dried while the thin fraction is disposed of. A drawback hereof is that a large part of precisely those minerals which can serve as nutrients for plants are dissolved in the thin fraction.

U.S. Pat. No. 5,666,905 describes a method wherein slurry drops through a slatted floor into a basement and there has the water removed with drains. Air from the living quarters is blown through and over the drained thick fraction in order to dry the manure.

A drawback of this method is that the manure is drained, whereby the manure is separated into a watery and a thick fraction. Only the thick fraction is dried and the thin fraction is disposed of. Since the manure accumulates in the basement, the air permeability is very poor, whereby it is necessary to apply a forced air flow for which a relatively large amount of energy is required to overcome the air resistance.

An additional drawback of the device described in U.S. Pat. No. 5,666,905 is that the space in which the manure is dried extends below the whole living quarters. The construction hereof entails extra cost.

U.S. Pat. No. 4,706,607 describes a device and method for drying manure. The slurry herein drops through a slatted floor into a basement in which a thick layer of sawdust is arranged. A shuffler is arranged to periodically shuffle the slurry and sawdust.

The sawdust has the purpose of absorbing the slurry. Air is introduced into the mixture of slurry and sawdust by the shuffling process in order to enhance the aerobic fermentation. Stated as option is to aerate the bottom part of the sawdust with an "air blowout pipeline". The air serves for the composting process and not for the purpose of drying. The drawback of this process is that the end product consists largely of sawdust, so that the mineral concentration is low. The amount of waste material is not reduced by adding the sawdust. The end product is moreover not really dried. A compost product is made.

SUMMARY OF THE INVENTION

The invention has for its object to prevent the above stated drawbacks and to provide a system which dries slurry to a form in which it can be disposed of without adverse consequences and wherein the emission of harmful substances, such as for instance ammonia gas, is reduced. All minerals are also preserved in the dried end product.

This objective is achieved according to the invention by a method which is characterized by measuring quantities of the drying air;

measuring quantities of air guided through the drying bed; and arranging the slurry, shuffling the carrier material and removing dried manure (or the dried industrial residual product or waste flow) on the basis of the measured quantities.

Measuring of the different quantities and performing the different steps on the basis thereof enables precise control of the process, whereby a minimal amount of energy is used to obtain a maximum result. These quantities are for instance the flow rate, temperature and air humidity of the air flow.

Use can be made in advantageous manner of the ventilation air of the living quarters. This air has an air humidity of around 80%. This stall air is usually preheated. Another advantage of using stall air is that it is ventilated in very large quantities.

In addition, the dust is filtered out of the is stall air by the device, so that it can be disposed of with the dried manure.

According to a further embodiment of the method according to the invention the method comprises the step prior to performing step (B) of adding an additive, such as a bacteria culture, to the slurry. The addition of an additive, for instance a bacteria culture, makes it possible to accelerate the decomposition of (harmful) substances, whereby the emission of for instance dust, ammonia and odour can be reduced. A chemical substance can also be envisaged as additive, whereby for instance the acidity of the slurry can be increased or decreased, or a vegetable substance which for instance dispels odour.

The invention further comprises a device for performing the method according to the invention, which device comprises:

a housing;

an air-permeable drying bed with suitable carrier material arranged in the housing;

application means arranged in the housing and placed above the drying bed for distributing slurry over the drying bed;

ventilation means for drawing in air from the living quarters and guiding the air through the drying bed; and removing means for removing a layer of thus dried manure (or other dried product).

In a preferred embodiment of a device according to the invention, this device comprises a shuffler device for shuffling the dried slurry on the drying bed in order to ensure a predetermined air-permeability. The thickness of the drying bed is preferably kept as small as possible, for instance a thickness of 3–10 cm. The pressure losses over the drying bed are kept minimal by the shuffling, whereby operation can usually take place with the existing ventilators of the living quarters (or, in the case of industrial applications, the factory). No additional energy, or only a minimal amount, is then necessary to guide the air through the drying bed. At start-up a carrier material other than the product for drying is usually used temporarily (for instance a compost-like product). The shuffler device can be embodied such that it also form the removing means for removal of a layer of manure.

In yet another preferred embodiment of the device according to the invention, the device comprises a reservoir for storing the slurry; and means for mixing the manure in the reservoir in order to obtain a substantially homogeneous mixture. When the slurry is pumped out of the manure pit, it is then not completely homogenous. So as to allow spraying and/or distribution of the slurry to take place optimally and to prevent fouling or blockage of the sprayers, the slurry is stored temporarily in a reservoir and there homogenized by means of homogenizing means such that an improved homogeneity results.

The housing of the device is preferably formed by a container of standardized dimensions. It is hereby possible to construct the system in the container and to transport the whole container, including the device, to an existing living quarters and there connect it to the air extraction. Another advantage of a container is that it is readily insulated, whereby little heat is lost. A separate space in a living quarters or in an area of a living quarters can for instance also serve as housing.

In a further preferred embodiment of the device a heat exchanger is connected onto the outlet of the ventilation means with which fresh air carried into the living quarters can be heated with the used air from the living quarters.

These and other features of the invention will be further elucidated with reference to the annexed drawing.

BRIEF DESCRIPTION OF THE DRAWING

FIG. 1 shows a perspective view of a device according to the invention.

DESCRIPTION OF THE PREFERRED EMBODIMENTS

The device 1 according to the invention is placed adjacently of a living quarters 2. Slurry is pumped via a pipeline 3 and a pump 4 into device 1. Stall air is further blown out of living quarters 2 into device 1 by means of a fan and an air duct 6.

Device 1 comprises a housing 7. This housing 7 is formed by a container of standardized dimensions. Pipeline 3 through which the slurry is supplied passes through a side wall of housing 7 and debouches into a reservoir 8. Fluctuations in the discharge from the reservoir can be compensated by this reservoir. It is further possible to arrange means in the reservoir for mixing the slurry. The slurry hereby acquires a better homogeneity. Bacteria can also be added to the reservoir.

Via a suction pipe 9 the slurry is pumped upward out of reservoir 8 to sprayers 10 which are arranged in the top part of housing 7. Arranged under these sprayers 10 is a drying bed 11 on which a carrier material 12 is arranged at the start of the drying process. This carrier material can for instance consist of a compost-like material or of dried slurry which is already present. A quantity of slurry is sprayed continuously or periodically onto this carrier material 12 from sprayers 10. Via fan 5 and air duct 6 air from the living quarters is further blown and/or sucked into housing 7 and this air is forced through drying bed 11. The air can also be extracted from the container. Here the stall air is extracted via a discharge pipe 13 and a fan 14. Because the relatively dry stall air is drawn through the carrier material and the drying bed the slurry will dry. This results in a layer 15 of dried manure on carrier material 12.

In order to ensure the air-permeability of drying bed 11, carrier material 12 and the dried manure 15, a (travelling) shuffler device 16 is arranged above drying bed 11. Shuffler device 16 comprises for instance a number of blades 17 which can reach to drying bed 11. It is hereby possible by rotating the blades to shuffle and mix carrier material 12 and dried manure 15, thereby creating a mass with a relatively high air-permeability. When the mass of carrier material 12 and dried manure 15 rises above a certain predetermined height, it is then necessary to discharge a part of this mass. This can take place by causing shuffler device 16 to scrape over the top of the mass of carrier material 12 and dried manure 15 is and to discharge the mass via a hatch 18 or for instance a screw conveyor to the outside.

After prolonged use the carrier element is therefore formed by dried manure.

Device 1 further preferably comprises a control device (not shown) which measures quantities of the air flow in air duct 6 and the air flow in discharge pipe 13. These quantities are flow rate, temperature and relative humidity and optionally the pressure loss over the drying bed. On the basis of this measured data the control calculates how much water there is in the ingoing air and how much water there is in the outgoing air. When the discharged quantity of water corresponds roughly with the quantity of water from the slurry which has been arranged on the bed, a fresh quantity of slurry will then be arranged on the drying bed.

It is also possible to measure the pressure difference over the drying bed. A normal pressure difference over a properly air-permeable drying bed amounts to about 30–50 pascal. When the drying bed no longer complies with air-permeability requirements, the pressure difference will then increase to 100–200 pascal.

When a quantity of dried material is removed from the drying bed it will then contain for instance 40% solids. It is possible to arrange this removed part on a special area of the drying bed where it can dry further, preferably at the end of the drying bed. Since the arranged material is already comparatively dry, the air-permeability will be sufficient and a thicker layer can be arranged on a relatively small area for the purpose of further drying. (Further) drying to about 85% solids is possible in this manner.

On the basis of the foregoing it will be apparent that the most homogeneous possible distribution of the product for drying over the drying bed is essential. In the distribution of slurry use is preferably made of a tipping body which is pulled over the drying bed and is slowly unloaded. The slurry subsequently drops onto a rotating distribution mechanism, for instance a disk, or onto a rotating brush or the like. Another option is distribution of the slurry with air support (distribution of the slurry under pressure over the drying bed). In the case of solid materials (usually already pre-dried materials which for instance have to be dried from 40% to 85% solids), the distribution mechanism can for instance be only the tipping body. The applied material is then levelled out/distributed homogeneously over the drying bed with a scraping and/or shuffling mechanism which is pulled over the drying bed.

Container 7 must preferably be well insulated to prevent energy losses. Because the fan 14 is preferably arranged in the container, the heat generated thereby will also be partially used to dry the slurry.

It is possible, depending on the capacity required, to place one or more containers parallel to each other.

In the drying of industrial effluent or industrial residues the process is per se identical. From a cost viewpoint use is preferably then made of a drying air flow which is already available on site.

What is claimed is:

1. A method for drying a substance selected from the group consisting of slurry, rinse water, industrial effluent and industrial residues, which method comprises the steps of:

providing an air-permeable drying bed with suitable carrier material;

arranging the substance on the drying bed;

drawing in and/or blowing drying air and guiding this air through the drying bed;

removing the dried substance;

shuffling the carrier material at chosen times in order to ensure a predetermined air-permeability of the drying bed;

measuring quantities of the drying air going in the drying bed;

measuring quantities of air going out of the drying bed; and arranging the substance, shuffling the carrier material and removing dried substance on the basis of the measured quantities.

2. The method as claimed in claim 1, wherein the quantities are selected from the group consisting of flow rate, temperature and relative humidity.

3. The method as claimed in claim 1, wherein the air is air from living quarters of animals.

4. The method as claimed in claim 1, comprising the step of:

adding an additive to the slurry.

5. The method of claim 4, wherein the additive comprises a bacteria culture.

6. The method of claim 1, wherein the substance comprises manure produced by animals in a living quarters.

7. The method of claim 1, wherein the substance is arranged on the drying bed by spraying.

8. The method of claim 1, wherein the chosen times are periodic.

9. The method of claim 1, wherein the chosen times are continuous.

10. A device for performing the method as claimed in claim 1, which device comprises:

a housing;

an air-permeable drying bed with suitable carrier material arranged in the housing;

application means arranged in the housing and placed above the drying bed for substantially homogeneous distribution of substance over the drying bed;

ventilation means for drawing and/or blow air homogeneously from living quarters for animals and guiding this air through the drying bed;

removing means for removing a layer of thus dried manure;

measuring means for measuring quantities of air going in the drying bed and quantities of air going out of the drying bed; and control means for controlling the application means and the removing means on the basis of the measured quantities.

11. The device as claimed in claim 10, further comprising a shuffler device for shuffling the carrier material on the drying bed in order to ensure a predetermined air-permeability.

12. The device as claimed in claim 10, further comprising:

a reservoir for storing the substance; and means for homogenizing the substance in the reservoir.

13. The device as claimed in claim 10, wherein the housing is a container of standardized dimensions.

14. The device as claimed in claim 10, wherein a heat exchanger with two circuits is connected to the outlet of the ventilation means, wherein air guided through the drying bed flows through the first circuit and wherein fresh, clean air flows through the second circuit such that heat is exchanged between the two flows.

15. The device as claimed in claim 10, comprising:

measuring means for measuring quantities of air from the living quarters and of the air guided through the drying bed; and control means for controlling the application means, the removing means and/or the shuffler device on the basis of the measured quantities.

* * * * *